(12) United States Patent
Emmei

(10) Patent No.: US 6,388,558 B1
(45) Date of Patent: May 14, 2002

(54) KEY SYSTEM

(75) Inventor: Toshiharu Emmei, Nagoya (JP)

(73) Assignee: ADC Technology Inc., Aichi (JP)

( * ) Notice: Subject to any disclaimer, the term of this patent is extended or adjusted under 35 U.S.C. 154(b) by 0 days.

(21) Appl. No.: 09/145,760

(22) Filed: Sep. 2, 1998

(30) Foreign Application Priority Data

Dec. 3, 1997 (JP) .............................................. 9-333106

(51) Int. Cl.[7] ................................................. G06F 7/04
(52) U.S. Cl. .......................... 340/5.2; 340/5.1; 340/5.6; 70/460
(58) Field of Search ........................ 340/825.31, 425.5, 340/426, 5.1, 5.2, 5.6; 70/460; 701/36

(56) References Cited

U.S. PATENT DOCUMENTS

| | | | | |
|---|---|---|---|---|
| 5,517,184 A | * | 5/1996 | Dawson et al. | 340/825.31 |
| 5,742,236 A | * | 4/1998 | Cremers et al. | 340/825.31 |
| 5,801,614 A | * | 9/1998 | Kokubu | 340/425.5 |
| 6,008,722 A | * | 12/1999 | Hirozawa et al. | 340/426 |

* cited by examiner

*Primary Examiner*—Michael Horabik
*Assistant Examiner*—M Shimizu
(74) *Attorney, Agent, or Firm*—Davis & Bujold, P.L.L.C.

(57) ABSTRACT

A key system using an ID card which can output ID data is combined with a mechanical ignition key. The key system is provided with a transceiver for receiving ID data from the ID card, a flash memory for storing the ID data and a CPU. When the stored ID data in the flash memory coincides with the ID card data obtained by the transceiver and operation is performed with the ignition key, the CPU enables the operation of an engine start. Furthermore, if a preset protection time has elapsed since the CPU recognizes the coincidence of the stored and ID card data, the operation by the ignition key is nullified.

3 Claims, 14 Drawing Sheets

KEY SYSTEM

FIELD OF THE INVENTION

The present invention relates to a key system which is used in an ignition key for use in a car, a motorcycle, or the like, or an operation key to a door for use at a building entrance, a storehouse, or the like or for a computer system.

BACKGROUND OF THE INVENTION

In these days, it is not unusual that a family owns a plurality of cars or motorcycles. Since the family members have a plurality of cars or motorcycles, they also have a plurality of keys for operating each car. Moreover, when they go outside by car, they carry a house front door key and the like as well as a car key.

However, it is troublesome to own a plurality of keys in this manner and further to often confirm which key is to be used.

Moreover, in some case, the key is carelessly forgotten to be removed. In a delivery car or the like, the key is sometimes intentionally kept without being removed because it is troublesome to repeatedly stop/start the engine. In this case, the car may be stolen. Furthermore, if the stolen car is used in a crime, it may cause trouble for other people as well as the damage of the car theft.

OBJECT AND SUMMARY OF THE INVENTION

Wherefore, an object of the present invention is to provide a key system which can be easily managed and also has high safety.

To achieve the object, a key system uses, as a key, an ID card for outputting ID output signals including ID data to the outside. The key system is provided with ID signal receiving means for receiving ID output signals transmitted from the ID card; ID extracting means for extracting ID data from ID output signals received by the ID signal receiving means; ID storage means for storing ID data beforehand; coincidence determination means for determining whether or not there is the ID data coinciding with the ID data extracted by the ID extracting means; operation enabling means for making effective equipment unlocking or equipment operation when the coincidence determination means admits coincidence of both ID data. In the key system, a driver's license, a passport, or one of other identity proving ID cards that can univocally specify an owner's identity is used. The system is further provided with a memory content change means for adding/deleting memory content of the ID storage means.

In the key system, the driver's license, the passport or one of other ID cards which can emit ID output signals is used as the key. ID output signals emitted from such an ID card are received, the ID data included in the signals is read, it is determined to whose ID data the ID data corresponds, and operation of the key system is permitted only when the ID data belongs to a person who is permitted the operation thereof.

As the information for univocally specifying the owner's identity, name, birthday, blood type, sex, license registration number, member number, and the like are used.

In this manner, different from the conventional key system, determination is not based on whether or not the key is owned. In the present key system, the driver's license, the passport or one of other identity proving ID cards is used to determine whether or not a person is permitted. Such an ID card is very difficult to be copied or forged. Therefore, it is substantially impossible to prepare a duplicate key without permission of the key system manager and perform operation without permission. Therefore, the key system has very high safety. Moreover, if ID data of a certain person is stored (registered) in a plurality of key systems, the person can perform unlocking and other operations for a plurality of equipment with only one ID card. Therefore, a purse or a pocket can be kept in order.

In addition to the driver's license and the passport, in the near future, a credit card, an electronic money card, a health insurance card, and the like provided with an IC chip which can emit ID output signals to the outside are to be issued. These can be used as the aforementioned identity proving ID cards. Alternatively, a card issued to each citizen or each resident by the government, a local public entity, or the like may be used.

Moreover, according to the key system when the coincidence determination means admits the coincidence of both ID data in the key system the equipment unlocking or equipment operation is performed.

In the key system, when ID data of a person who is permitted to perform operation is confirmed, the equipment is unlocked or operated.

With the constitution, for example, in order to permit a plurality of people to enter one room, the key system is applied to a room entrance/exit door, and ID data of permitted people are registered beforehand. By determining coincidence/nonconformity of ID data, a person is permitted to enter/exit or prohibited from entering/exiting. Furthermore, when business is finished, in order to prohibit entering/exiting from the room, ID data of the corresponding person may be deleted from the key system. Therefore, the system is convenient for a room manager because he/she does not need to pass keys to a plurality of people or collect the keys from them. Moreover, if the ID data of a certain person is registered in a plurality of door key systems, the person can go into or out of a plurality of rooms with only one ID card, and key management is easy. Therefore, by applying the system to a hotel room door and registering ID data of a person who has reserved the room, the person can use the room without receiving a key at the front desk.

Additionally, the key system may be applied to a condominium front door. In this case, means may be provided for storing a person who has opened the door and a time when the door has been opened. With the constitution, a person other than registered residents cannot open the door. Also, it can be managed who entered the condominium and when it was. Therefore, the safety can be enhanced. Furthermore, the system may be constituted in such a manner that the moment someone enters the condominium, the room interphone, telephone, or the like becomes connected.

Moreover, the key system may be applied to an entrance of the place where an admission fee is to be paid, for example, an amusement park, a membership system restaurant, or the like. In this case, when a credit card or an electronic money card is used as an ID card, the fee can be collected simultaneously with entrance. Moreover, by providing the means for storing the time and the person who has entered as aforementioned, customer management can be facilitated.

The key system may be applied to a television set installed in a hotel or inn guest room. The system may be constituted in such a manner that projection is performed by determining whether or not a person who has presented the ID card is over eighteen years old. With the constitution, there is no possibility that children watch a program for adults only.

Similarly, when the key system is applied to an entrance to a pachinko parlor or each pachinko machine, there is no possibility that children illegally play pachinko. Additionally, by providing the means for storing the time and the person who has entered as aforementioned, the customer management can be facilitated.

Moreover, according to the key system an ID card and a physical key are both used in the key system. When the coincidence determination means admits the coincidence of both ID data and further physical key operation is performed, the equipment unlocking or operation is performed.

In the key system, only when the ID data of a person who is permitted to operate and the physical key are both present, operation can be performed. Specifically, the key system is locked up double.

As aforementioned, since operation cannot be performed until there are provided both the ID card and the key, a very high safety is assured. Therefore, for example, when the key system is applied to a safe locked double with a key and a dial in such a manner that the safe cannot open until the ID data of all the managers are entered, safety is enhanced because the presence of the key, the coincidence of dial numbers, and the entry of ID data of all the managers form conditions for unlocking the safe.

Moreover, according to the key system, the key system is further provided with time setting means for setting an operation effective time for which key operation is effective. The key operation is effective until the operation effective time set by the time setting means elapses after the coincidence determination means admits the coincidence of both ID data.

In the key system, when the ID data of the person who is permitted to operate is recognized and the operation effective time is set, operation can be performed only with the key before the operation effective time elapses.

In the key system, when the person who is permitted to operate sets the operation effective time and passes the key to a person who is not permitted to operate, the person who is not permitted to operate can also be allowed to temporarily operate the system.

According to the key system which is a specific application example, the ID card is a driver's license, the key is an ignition key, and the equipment is a car, a motorcycle, or one of other vehicles in the key system.

In the key system, the key system is applied to a car or the like.

In the key system, the operation of the ignition key is not effective until the presence of the driver's license is confirmed. Therefore, even if the ignition key is lost, the car or the like is prevented from being driven by a finder without permission. Therefore, safety is assured. Additionally, by setting the operation effective time as aforementioned, even if the car or the like parked/stopped while the engine is kept on should be stolen, a secondary damage caused by a crime or a traffic accident can be prevented. Furthermore, if there is no driver's license, the car cannot be driven. Therefore, the driving without carrying the driver's license or the illicit driving can be prevented.

Moreover, by providing means for storing the age limitation of an insurance for a car, for example, storing information that drivers under 26 are not covered by the insurance, the system may be constituted in such a manner that a person is prohibited from driving if the age of the person stored in the driver's license is not covered by the insurance. Alternatively, the system may be constituted in such a manner that it is determined from an accident history stored in a driver's license whether or not it is appropriate to permit a person to drive. As the case may be, the person is prohibited from driving.

Furthermore, when there is provided means for storing a person who has driven a car and the time, employee management can be facilitated in a taxi company or a transportation company.

DETAILED DESCRIPTION OF THE INVENTION

An example of the mode of practicing the present invention will now be described with reference to the drawings. A case where the key system of the present invention is applied to a car is herein illustrated.

First, the constitution of the key system will be described.

In addition to an ignition key, the present key system uses a master ID card which is affixed to each car and which can transmit ID data to the outside and a driver's license which can transmit ID data of a driver's licensee to the outside, so that locking/unlocking or the like is performed. The ID card and the driver's license will be detailed later.

A control unit 1 for administering the operation of the present key system is, as shown in FIG. 3, attached in the vicinity of a steering wheel 11 at a driver's seat in the car. A monitor 2 for displaying a response, a warning, and the like from the key system is attached adjacent to the control unit 1.

As shown in FIG. 1, the control unit 1 is provided with a key operation unit 100 for setting an operation mode as described later or performing other operations, and an ID card interface unit 200 for receiving ID data from the master ID card and the driver's license (hereinafter, both referred to simply as the ID card 400 as the case may be). The ID card interface unit 200 is disposed under the key operation unit 100.

The key operation unit 100 is provided with a main face plate 110, an operation mode selection ring 120, an ignition key face plate 130, and an ignition key position indicating plate 140. Additionally, the main face plate 110, the operation mode selection ring 120, the ignition key face plate 130, and the ignition key position indicating plate 140 have surfaces on substantially the same plane. Moreover, the operation mode selection ring 120 and the ignition key position indicating plate 140 have their rotation axis centers in the center of the main face plate 110.

The main face plate 110 constitutes a surface plate of the key operation unit 100, and has on its surface a protection time sign 111, a protection sign 112, a usual sign 113, a combination sign 114, a registration sign 115 and a deletion sign 116.

The operation mode selection ring 120 is used for selecting the operation mode of the car, and provided with an indicating protrusion 121 for pointing to the signs 111 to 116 arranged on the main face plate 110. Additionally, a state in which the indicating protrusion 121 points to the protection time sign 111 is referred to as "protection time setting state". Similarly, states in which the indicating protrusion 121 points to the signs 112 to 116 are referred to as "protection mode selecting state", "usual mode selecting state", "combination mode selecting state", "registration mode selecting state", and "deletion mode selecting state", respectively. The operation-modes described above will be detailed later.

The ignition key face plate 130 has substantially the same structure as the known structure, and has OFF sign 132, ACC sign 133, ON sign 134, START sign 135 and, additionally, SELECT sign 131 inscribed on its surface in the same manner as in the known structure.

The ignition key position indicating plate 140 constitutes a surface plate of a known ignition key cylinder, and has an alternative ignition key member 141 protruded on its surface. Furthermore, the alternative ignition key member 141 is provided with an insertion port 142 through which the ignition key is inserted. When the ignition key is inserted into the insertion port 142 and rotated, the ignition key position indicating plate 140 and the alternative ignition key member 141 are also rotated together with the ignition key cylinder. Moreover, at the usual time, when the ignition key is not inserted in the insertion port 142, the ignition key position indicating plate 140 cannot be rotated. Hereinafter, a state in which the tip end of the alternative ignition key member 141 points to SELECT sign 131 is referred to as "SELECT state". Similarly, states in which the tip end points to the signs 132 to 135 are referred to as "OFF state", "ACC state", "ON state", and "START state", respectively.

The ID card interface unit 200 is constituted of a main face plate 210 and an ID input switch 220. Additionally, the ID input switch 220 is formed in a push button shape.

Moreover, as shown in FIG. 2, the control unit 1 is provided inside with a CPU 311, a ROM 312, a RAM 313, a flash memory 314, input interfaces 321 to 323, output interfaces 331 to 333, an input/output interface 341, a relay unit 351, and a transceiver 361.

The CPU 311 arithmetically processes the information obtained from the memory and the interfaces, and transmits results to the memory and the interfaces. The ROM 312 stores each processing program of the key system and other information. The RAM 313 temporarily stores the results of the operation of the CPU 311 and the like. The flash memory 314 is, as shown in FIG. 4, divided into a master ID data area 314A, a registration ID data area 314B, an operation mode area 314C, a protection time area 314D, an engine start prohibition flag area 314E and the like, to store ID data of the master ID card, ID data of the person who is permitted to operate the key system, and the like.

The input interface 321 converts the state of the operation mode selection ring 120, i.e., to which of the signs 111 to 116 the indicating protrusion 121 is pointing, into an electric signal. The input interface 322 converts the determination of whether or not the ID input switch 220 is pushed into an electric signal. The input interface 323 converts the state of the ignition key position indicating plate 140, i.e., to which of the signs 131 to 135 the tip end of the alternative ignition key member 141 is pointing, into an electric signal.

Following an instruction of the CPU 311, the output interface 331 energizes any one of relay coils RC1, RC2 and RC3 of the relay unit 351. The output interface 332 transmits the instruction of the CPU 311 to an engine controller EC. The output interface 333 transmits the information sent from the CPU 311 to the monitor 2. The input/output interface 341 converts ID data or the like into an appropriate format to transmit the data to the transceiver 361, and converts ID data or the like received from the transceiver 361 into an appropriate format to transmit the data to the CPU 311. The relay unit 351 has a known structure in which a relay contact is closed by excitation of the relay coil. The relay coil RC1 is associated with a relay contact RT1, the relay coil RC2 is associated with a relay contact RT2, and the relay coil RC3 is associated with a relay contact RT3. Additionally, the relay contacts RT1, RT2 and RT3 are arranged in parallel with a known ignition switch IS which is disposed between a [+] terminal (battery) and ACC, ON and START terminals.

The transceiver 361 communicates with an ID card 400 to receive ID data.

Moreover, as shown in FIG. 5, the ID card 400 is provided inside with a CPU 411, a ROM 412, a RAM 413, a flash memory 414, an input/output interface 421, a transceiver 431, and a power supply circuit 441. The transceiver 431 communicates with the transceiver 361 in the control unit 1. The power supply circuit 441 receives a power carrying wave sent from a power carrier (not shown) disposed in the control unit 1, and supplies the power to each section in the ID card 400.

The control unit 1 communicates with the ID card 400 in the following manner. The communication process will be described with reference to a flowchart of FIG. 6.

First, the CPU 311 transmits an instruction to the power carrier (not shown) disposed in the control unit 1, so that power carrying waves are transmitted to the ID card 400 (S610). Subsequently, the CPU 311 sends an instruction to the transceiver 361 via the input/output interface 341 to transmit a signal to the ID card 400 requesting transmission of ID data (S620). And then, it waits for return data including ID data from the ID card 400.

If there is a return from the ID card 400 (S630: YES), the ID data is extracted from the return data (S640), and the extracted ID data is stored in RAM 313 or the flash memory 314 (S650). Subsequently, the CPU 311 transmits an instruction to the monitor 2 via the output interface 333 to display a message that it has succeeded in communication (S660), thereby ending the process.

If the predetermined time elapses (S670:YES) while there is no return from the ID card 400 (S630:NO), the CPU 311 transmits an instruction to the monitor 2 via the output interface 333 to display a message that it has failed in communication (S690), thereby ending the process.

The operation of the entire key system will next be described.

First, the process of main routine in the present key system will be described based on a flowchart of FIG. 7.

First, the CPU 311 determines via the input interface 323 whether or not the ignition key position indicating plate 140 is in SELECT state (S705). Subsequently, if the ignition key position indicating plate 140 is in SELECT state (S705:YES), the CPU 311 determines via the input interface 321 whether or not the operation mode selection ring 120 is in the protection time setting state (S710). Subsequently, if the operation mode selection ring 120 is in the protection time setting state (S710:YES), the CPU 311 executes a protection time setting process as described later (S715). If the operation mode selection ring 120 is not in the protection time setting state (S710:NO), the CPU 311 executes an operation mode selection process as described later (S720). Additionally, if the ignition key position indicating plate 140 is not in SELECT state (S705:NO), the CPU 311 executes neither the protection time setting process nor the operation mode selection process.

Subsequently, the CPU 311 reads the memory content of the operation mode area 314C in the flash memory 314 (S725), and determines which operation mode is at present selected (S730, S740, S750, S760). If the combination mode is presently selected (S730:YES), the combination mode described later is executed (S735). Similarly, if the presently selected operation mode is a protection mode, a registration mode, a deletion mode, or a normal mode (S740:YES, S750:YES, S760:YES, S760:NO), the protection mode, the registration mode, the deletion mode, or the normal mode is executed as described later (S745, S755, S765, S770).

The operation mode selection process will next be described based on a flowchart of FIG. 8.

First, the CPU 311 transmits an instruction to the monitor 2 via the output interface 333 to display a message that the operation mode selection process is being executed (S805). Subsequently, the CPU 311 instructs the monitor to display a message requesting for presentation of the master ID card (S810). And then, it waits until the ID input switch 220 is pushed.

If the ID input switch 220 is pushed (S815:YES), the CPU 311 executes the communication process described above (S820). Subsequently, the CPU 311 compares the master ID data obtained by executing the communication process with the master ID data stored in the master ID data area 314A in the flash memory 314 (S825). If both master ID data coincide with each other (S825:YES), the CPU 311 acquires, via the input interface 321, which of the protection mode selection state, the normal mode selection state, the combination mode selection state, the registration mode selection state and the deletion mode selection state the operation mode selection ring 120 is in(S830). Subsequently, the corresponding operation mode is stored in the operation mode area 314C in the flash memory 314 (S835). Subsequently, the CPU 311 sends an instruction to the monitor 2 via the output interface 333 to display a message that it has succeeded in selection of the operation mode (S840). Then, by resetting the engine start prohibition flag area 314E in the flash memory 314, the CPU 311 enables the engine to start (S845), thereby ending the process. Additionally, an engine start prohibition flag will be described hereinafter in detail.

If the predetermined time elapses (S850:YES) while the ID input switch 220 is not pushed (S815:NO), or if both master ID data do not coincide with each other at S825 (S825:NO), the CPU 311 sends an instruction to the monitor 2 via the output interface 333 to display a message that it has failed in selection of the operation mode (S855), ending the process.

Each operation mode process will next be described.

First, the normal mode will be described. In the normal mode, as in a conventional car, a person who owns the ignition key is permitted to operate the car, and any processing is not performed.

When the normal mode is executed, a message is displayed on the monitor 2 that the normal mode is being executed and that the car can be operated with the ignition key (FIG. 9, S910). The ignition key is inserted into the insertion port 142 and rotated to obtain START state, and the car is operated in the same manner as the conventional car.

The combination mode will next be described. In the combination mode, not only the person who owns the ignition key but a person whose ID data is registered in the registration ID data area 314B in the flash memory 314 is permitted to operate the car. The combination mode process will be described based on a flowchart of FIG. 10.

When the combination mode is executed, the CPU 311 transmits an instruction to the monitor 2 via the output interface 333 to display the message that the combination mode is being executed and that the car can be operated with the ignition key or the registered driver's license (S1010). Subsequently, it waits until the ID input switch 220 is pushed.

The combination mode is the same as the normal mode until the ID input switch 220 is pushed (S1020:NO), and only the operation with the ignition key is permitted.

If the ID input switch 220 is pushed (S1020:YES), the CPU 311 executes the communication process described above (S1030). Subsequently; the CPU 311 compares the ID data obtained by executing the communication process with the ID data stored in the registration ID data area 314B in the flash memory 314 (S1040). If coincident ID data is found (S1040:YES), the CPU 311 gives a permission in such a manner that the ignition key position indicating plate 140 can be rotated by manually turning the alternative ignition key member 141 even if the ignition key is not inserted in the insertion port 142 (S1050). Subsequently, the CPU 311 transmits an instruction to the monitor 2 via the output interface 333 to display a message that the rotation of the ignition key position indicating plate 140 is permitted (S1060), ending the process.

If no coincident ID data is found (S1040:NO), the CPU 311 transmits an instruction to the monitor 2 via the output interface 333 to display a message that only the operation with the ignition key is possible (S1070), ending the process.

After permission is given at S1050 of the combination mode, the engine is started as follows: First, by manually turning the alternative ignition key member 141, the ignition key position indicating plate 140 is displaced into START state. Then, the CPU 311 obtains the corresponding signal from the input interface 323. Subsequently, the CPU 311 transmits an instruction to the output interface 331, so that the relay coil RC3 of the relay unit 351 is energized, and the relay contact RT3 is closed. In this case, [+] terminal is connected to START terminal, an electric power is supplied to engine sections and a starter (not shown), and the engine is started. When the alternative ignition key member 141 is released at an appropriate time, the ignition key position indicating plate 140 is rotated by a spring (not shown) and displaced into ON state. In ON state, the relay coil RC2 is energized instead of the relay coil RC3, the relay contact RT2 is accordingly closed, [+] terminal is connected to ON terminal, and electric power is supplied to the engine sections and accessory sections. Moreover, when the alternative ignition key member 141 is manually rotated into ACC state, the relay contact RT1 is closed by energizing the relay coil RC1, and electric power is supplied to the accessory sections.

The protection time setting process will next be described based on a flowchart of FIG. 11. Additionally, the protection time will be described in description of the protection mode.

First, the CPU 311 transmits an instruction to the monitor 2 via the output interface 333 to display a message that the protection time setting process is being executed (S1105). Subsequently, another message is allowed to be displayed requesting for presentation of the master ID card (S1110). Then, the CPU waits until the ID input switch 220 is pushed.

If the ID input switch 220 is pushed (S1115:YES), the CPU 311 executes the aforementioned communication process (S1120). Subsequently, the CPU 311 compares the master ID data obtained by executing the communication process with the master ID data stored in the master ID data area 314A in the flash memory 314 (S1125). If both master ID data coincide with each other (S1125:YES), the CPU 311 acquires via the input interface 321 to which protection time sign the indicating protrusion 121 of the operation mode selection ring 120 is pointing (S1130). The corresponding protection time is then stored in the protection time area 314D in the flash memory 314 (S1135). Subsequently, the CPU 311 transmits an instruction to the monitor 2 via the output interface 333 to display a message that it has succeeded in setting the protection time (S1140), ending the process.

If the predetermined time elapses (S1150:YES) while ID input switch 220 is not pushed (S1115:NO), or if both master ID data do not coincide with each other at S1125 (S1125:NO), the CPU 311 transmits an instruction to the monitor 2 via the output interface 333 to display a message that it has failed in setting the protection time (S1155), ending the process.

The protection mode will next be described. In the protection mode, the person who owns the ignition key is permitted to operate the car only for the protection time set in the protection time setting mode. The protection mode process will be described based on a flowchart of FIG. 12.

When the protection mode is executed, the CPU 311 transmits an instruction to the monitor 2 via the output interface 333 to display a message that the protection mode is being executed (S1205). Subsequently, the elapsed time since the start of the protection mode is measured, and the remaining time of the protection mode is calculated by subtracting the measured time from the protection time (S1210). Subsequently, an instruction is transmitted to the monitor 2 via the output interface 333 to display the remaining time of the protection mode Subsequently, the CPU 311 determines whether or not the elapsed time since the start of the protection mode reaches the protection time, i.e., whether or not the remaining time of the protection mode is zero (S1220). If time is still left in the protection mode (S1220:YES), the CPU 311 calculates the remaining time of the protection mode again (S1210), and it instructs the monitor 2 to display the remaining time (S1215).

Subsequently, if the remaining time of the protection mode is zero (S1220:NO), the CPU 311 transmits an instruction to the monitor 2 via the output interface 333 to display a message requesting for presentation of the driver's license (S1225).

Subsequently, the CPU 311 determines whether or not the car is stopped (S1230). If the car is stopped (S1230:YES), the CPU determines whether or not the predetermined time elapses since the car is stopped (S1235). If the predetermined time elapses since the car is stopped (S1235:YES), the CPU 311 transmits an instruction to the engine controller EC via the output interface 332 to stop the engine (S1240). Subsequently, the engine start is prohibited, and the prohibition instruction is stored in the engine start prohibition flag area 314E in the flash memory 314 (S1245). Then, the CPU 311 transmits an instruction to the monitor 2 via the output interface 333 to display a message that the engine start is prohibited (S1250). It waits until the ID input switch 220 is pushed.

If the ID input switch 220 is pushed (S1255:YES), the CPU 311 executes the aforementioned communication process (S1260). Subsequently, the CPU 311 temporarily stores the ID data obtained by executing the communication process in the RAM 313 to compare it with the ID data stored in the registration ID data area 314B in the flash memory 314 (S1265). If coincident ID data is found (S1265:YES), the CPU 311 transmits an instruction to the engine controller EC via the output interface 332 to permit the engine start (S1270), ending the process.

If the predetermined time elapses (S1275:YES) while the ID input switch 220 is not pushed (S1255:NO), or if no coincident ID data is found at S1265 (S1265:NO), the process is finished while the engine start is prohibited.

The registration mode will next be described. In the registration mode, a person is registered who is permitted to operate by collating the driver's license in the combination mode and the protection mode. The registration mode process will be described based on a flowchart of FIG. 13.

First, the CPU 311 transmits an instruction to the monitor 2 via the output interface 333 to display a message that the registration mode is being executed (S1310). Subsequently, another message is displayed requesting presentation of the driver's license (S1320). Then, the CPU waits until the ID input switch 220 is pushed.

When the ID input switch 220 is pushed (S1330:YES), the CPU 311 executes the aforementioned communication process (S1340). Subsequently, the CPU 311 stores ID data obtained by executing the communication process into the registration ID data area 314B of the flash memory 314 (S1350). Then, the CPU 311 transmits an instruction to the monitor 2 via the output interface 333 to display a message that the ID data of the presented driver's license has been registered (S1360), thereby ending the process.

If the predetermined time elapses (S1370:YES) while the ID input switch 220 is not pushed (S1330:NO), the CPU 311 transmits an instruction to the monitor 2 via the output interface 333 to display a message that the ID input switch 220 is not pushed (S1380), thereby ending the process.

The deletion mode will next be described. Contrary to the registration mode, in the deletion mode, ID data of the person who has been permitted to operate is deleted. The deletion mode process will be described based on a flowchart of FIG. 14.

First, the CPU 311 transmits an instruction to the monitor 2 via the output interface 333 to display a message that the deletion mode is being executed (S1405). Subsequently, another message is displayed requesting selection of ID data to be deleted (S1410). Then, the CPU 311 transmits an instruction to the monitor 2 via the output interface 333 to display all registered ID data and to attach a pointer for indicating a deletion object to the ID data stored in region #1 of the registration ID data area 314B (S1415).

Subsequently, the CPU 311 determines whether or not the ignition key position indicating plate 140 is in SELECT state (S1420), and whether or not the ID input switch 220 is pushed (S1425). Subsequently, if the ignition key position indicating plate 140 is in SELECT state (S1420:YES), the CPU 311 changes the deletion object from ID data stored in region #1 to ID data stored in region #2 (S1450), updates display content, and displays it on the monitor 2 (S1415). Subsequently, when the ignition key position indicating plate 140 is again in SELECT state at S1420 (S1420:YES), the CPU 311 determines ID data stored in region #3 as the deletion object (S1450). In such a manner, when the ignition key position indicating plate 140 is in SELECT state, the CPU 311 successively changes ID data to be the deletion object.

When the ignition key position indicating plate 140 is not in SELECT state (S1420:NO), it is determined whether or not the ID input switch 220 is pushed (S1425). If the ID input switch 220 is pushed (S1425:YES), the CPU 311 executes the aforementioned communication process (S1430). Subsequently, the CPU 311 compares the master ID data obtained by executing the communication process with the master ID data stored in the master ID data area 314A of the flash memory 314 (S1435). If both master ID data coincide with each other (S1435:YES), the CPU 311 deletes ID data as the deletion object from the registration ID data area 314B of the flash memory 314 (S1440). Subsequently, the CPU 311 transmits an instruction to the monitor 2 via the output interface 333 to display a message that the selected ID data has been deleted (S1445), thereby ending the process.

If the predetermined time elapses (S1455:YES) while the ID input switch 220 is not pushed (S1425:NO), or if both master ID data do not coincide with each other in S1435 (S1435:NO), the CPU 311 transmits an instruction to the monitor 2 via the output interface 333 to display a message that it has failed in deleting ID data (S1460), thereby ending the process.

A case where the car to which the present key system is applied is actually used by a forwarding agent in transportation business will next be illustrated.

First, the usage in the combination mode will be described.

When the car is just obtained, no data is stored in the registration ID data area 314B of the flash memory 314, i.e., no one is permitted to operate the car with the driver's license in the combination mode. Therefore, a car manager registers the driver's license of a delivery person at the beginning. First, the ignition key is inserted into the insertion port 142 to set SELECT state. Subsequently, the operation mode selection ring 120 is turned to make the indicating protrusion 121 point to the registration sign 115. The master ID data is entered to execute the registration mode. According to the message on the monitor 2, ID data of the driver's license of the delivery person to be permitted to operate the car is entered, and stored in the registration ID data area 314B of the flash memory 314. When a plurality of delivery people are to be registered, the procedure described above is repeated.

Subsequently, the car manager turns the operation mode selection ring 120 to enter the master ID data and execute the combination mode. After the combination mode is executed, the delivery person presents his/her driver's license to the ID card interface unit 200, and performs operation for starting engine or the like by the alternative ignition key member 141. In order to cancel the operation permission, by executing the deletion mode, the corresponding delivery person's ID data is deleted.

The operation in the protection mode will next be described.

First, in the same manner as in the combination mode, ID data of the delivery person to be permitted to operate the car is registered. Subsequently, the protection time is set, and the protection mode is executed. After the protection mode is executed, the delivery person starts the engine or perform another operation by the ignition key.

If the elapsed time since the start of the protection mode reaches the protection time, and the engine is stopped, the delivery person presents the driver's license to the ID card interface unit 200. Then, after permission for engine start is given, the protection mode is executed again, and operation is permitted until the protection time is reached.

According to the embodiment described above, the following effects are achieved.

First, in the key system, the operation mode cannot be changed until both the master ID card attached to the car and the ignition key are used. Therefore, after the protection time is reached especially in the protection mode, other people than the person who owns the master ID card or the registered driver's license cannot restart the engine. Therefore, even if the car parked with the ignition key inserted thereto is stolen, the engine of the stolen car cannot be restarted.

Therefore, the stolen car can be prevented from being used in a crime, causing a traffic accident or causing other secondary damages.

Additionally, in the embodiment described above, even when the protection time elapses, the engine is not immediately halted. The engine is halted when the car is stopped and the predetermined time has elapsed since the car was stopped. If the operation of the engine is suddenly restricted to stop the car while running, an accident or damage is to be caused.

Moreover, in the combination mode of the key system, even a person who does not own the ignition key is permitted to operate the car just by collating the driver's license, if the person's ID data is registered in the key system. Therefore, just by registering or deleting ID data, the car owner can select the person who is permitted to operate the car, and does not need to transfer the ignition key to the person. Additionally, the driver's license which can transmit ID data to the outside is very difficult to counterfeit. Unlike the ignition key, it is impossible to duplicate the driver's license. Therefore, although the key system is easy to manage, its safety is very high. Moreover, in the key system, if the driver's license is not carried, the car cannot be driven. Therefore, the driving without carrying the driver's license can be prevented.

Furthermore, the age limitation of the insurance for the car, for example, the information that the age under 26 is not covered by the insurance may be stored beforehand in the flash memory 314. In this structure, if the age of the person stored in the driver's license is not covered by the insurance, driving is prohibited. Alternatively, the system may be constituted in such a manner that it is determined from an accident history stored in the driver's license whether or not it is appropriate to permit the person to drive. As the case may be, driving may be prohibited.

Additionally, for example, by storing the person driving the car and the time in the flash memory 314 at S650 of the communication process, the employee's working state can easily be managed in the taxi company or the transportation company.

The second embodiment will next be described based on FIG. 15. In the second embodiment, the key system is applied to the reservation of a hotel room.

First, the structure of the key system will be described.

As shown in FIG. 15, the present key system is constituted by the ID card 400, such as a driver's license, a credit card, or the like for transmitting the owner's ID data to the outside, a travel agent 510, a card reader 511 for reading ID data from the ID card 400, a travel agent terminal 512, a hotel 520, a hotel terminal 521, a guest room locking control device 522 for controlling each guest room key, and the like.

The operation of the present key system will next be described.

First, the guest visiting the travel agent 510 designates the hotel 520 where he/she wants to stay. Then, the travel agent 510 connects their terminal 512 to the designated hotel terminal 521 via Internet. They select the room which meets the requirements of the guest.

Subsequently, ID data is read from the guest's ID card 400 via the card reader 511 of the travel agent 510, and transmitted to the hotel terminal 521 via the travel agent terminal 512. The hotel terminal 521 transmits the corresponding room number, ID data and staying term to the guest room locking control device 522 to register the ID data and the term by which the room door can be opened. The door can be unlocked by the corresponding ID data during the staying term.

After the guest arrives at the hotel 520, just by presenting the card 400 to the card reader provided in the room door and having the ID data read, the guest can enter the reserved room.

In this manner, since the ID data output from the ID card 400 functions as the room key, the key does not need to be physically transferred between the hotel 520 and the guest. Therefore, check-in or check-out is unnecessary, and both the hotel 520 and the guest are released from bothersome procedures.

Moreover, since door unlocking is impossible after the staying term elapses, each room locking can easily be controlled.

The third embodiment will be described based on FIG. 16. The key system of the third embodiment can be used for general purposes.

First, the structure of the present key system will be described.

As shown in FIG. 16, the present key system is constituted by an ID card 400 and a control device 600. The control device 600 is provided with a card reader 610, a keyboard 620, a microcomputer 630 for performing operation in response to various inputs from the card reader 610 and the keyboard 620, and an operation instruction output terminal 640. The microcomputer 630 is provided with a CPU 631, a ROM 632, a RAM 633, a flash memory 634, an input interface 635, and an output interface 636.

The card reader 610 has a function of receiving ID output signals from the ID card 400 in the same manner as the card reader 511 described in the second embodiment. The keyboard 620 is a known keyboard for entering various inputs. In the microcomputer 630, the various signals of the card reader 610 and the keyboard 620 are received via the input interface 635, operation is performed based on the input content, and operation instruction signals are transmitted to the operation instruction output terminal 640 via the output interface 636, or collection instruction signals are transmitted to a collection instruction output terminal 650. The operation instruction output terminal 640 transmits the operation instruction signals from the microcomputer 630 to the outside device, and is connected, for example, to a locking device of an entrance or a room door, a starting device of a television set or a pachinko machine, or the like. The collection instruction output terminal 650 transmits the collection instruction signals from the microcomputer 630 to the outside, and is connected to a deposit account of a bank or a post office, or the like via a dedicated communication line.

The action of the present key system will next be described.

First, a key system manager registers the conditions (hereinafter referred to as "operation conditions") of a person who is permitted to operate the locking device, the starting device, or the like. Specifically, the ID data of the person who is permitted to operate the device is registered. Alternatively, the age range, sex and other conditions of the person who is permitted to operate the device are registered. Moreover, the fee to be collected for operating the locking device, the starting device, or the like (for example, the admission fee of an amusement park or a membership system restaurant, a ball rent fee for a pachinko game, and the like) is registered. The registration is performed by entering the information via the keyboard 620, and the operation conditions are stored in the flash memory 634 of the microcomputer 630.

The process executed by the CPU 631 of the microcomputer 630 after the registration will be described based on a flowchart shown in FIG. 17. The process is started, when the person who desires to operate the locking device, the starting device, or the like presents the ID card 400 to the card reader 610, the card reader 610 reads ID data from the ID card 400, and the card reader 610 transmits the ID data to the CPU 631. After the process starts, the CPU 631 transmits an instruction to the card reader 610 to read the ID data, and receives the ID data from the card reader 610 (S2010). Subsequently, it is determined whether or not the ID data meets the operation conditions stored in the flash memory 634 (S2020). If it is determined that the ID data satisfies the operation conditions (S2020:YES), an operation instruction signal is transmitted to the locking device, the start device, or the like via the operation instruction output terminal 640 to operate the locking device, the starting device, or the like (S2030). Subsequently, the fee necessary for operation of the locking device, the starting device or the like is collected from the deposit account via the collection instruction output terminal 650 (S2040). Subsequently, the ID data in combination with the time when the locking device, the starting device, or the like is operated, are stored in the flash memory 634 (S2050). The process thus ends.

Additionally, if it is determined by the CPU 631 at S2020 that the ID data does not satisfy the operation conditions (S2020:NO), the processes at S2030 and S2040 are not performed. The ID data in combination with the time when the card reader 610 reads the ID data (the time when the person who does not satisfy the operation conditions tries to operate the locking device or the starting device) are stored in the flash memory 634 (S2050). The process thus ends.

As aforementioned, in the present key system, it is determined whether or not the ID data transmitted from the ID card 400 coincides with the ID data of the person who is already registered, or whether or not the age range, sex and other conditions are satisfied. If the operation conditions are satisfied, the operation of the locking device, the starting device, or the like is permitted, and the fee can be collected from the deposit account in accordance with the operation of the locking device, the starting device, or the like.

If the key system is applied, for example, to the entrance door locking device in a condominium, people other than those who are already registered cannot open the door. In addition, it can easily be grasped who entered the condominium and when it was. Therefore, safety can be remarkably enhanced. Additionally, in this case, the fee does not need to be collected. Therefore, the fee to be collected is registered as zero.

Moreover, if the key system is applied, for example, to the entrance of an amusement park, a membership system restaurant, or the like, the registered fee can be collected simultaneously with entering. Additionally, it can easily be grasped in the same manner as aforementioned who entered the entrance and when it was, and customer management can easily be performed.

Furthermore, if the key system is applied to a television set installed in a hotel or inn guest room, by determining whether or not the age of the person who is going to watch television is under 18, the television program for adults can be prohibited from being projected to children.

In the same manner, when the key system is applied to the entrance of a pachinko parlor or each pachinko machine, children can be prevented from illicitly playing the game. Moreover, it can easily be grasped who played the game and when it was. Therefore, customer management can easily be performed, and the ball rent fee can easily be collected.

The embodiments of the present invention have been described above, but the present invention is not limited to the embodiments. The present invention can be embodied in further various manners. For example, the present invention

DESCRIPTION OF REFERENCE CHARACTERS

Figure 1:
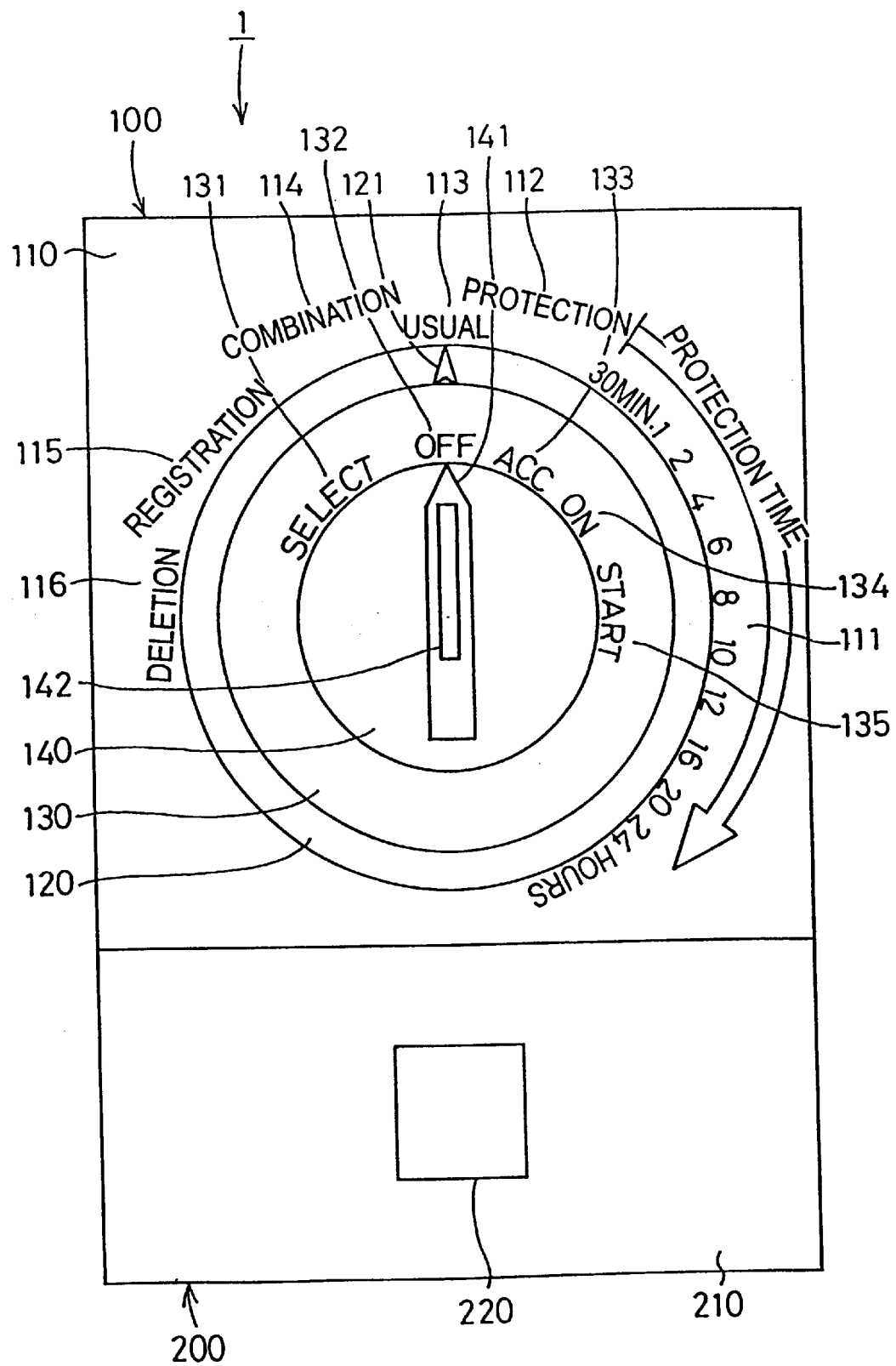
FIG. 1 is a front view of a control unit.
Figure 2:
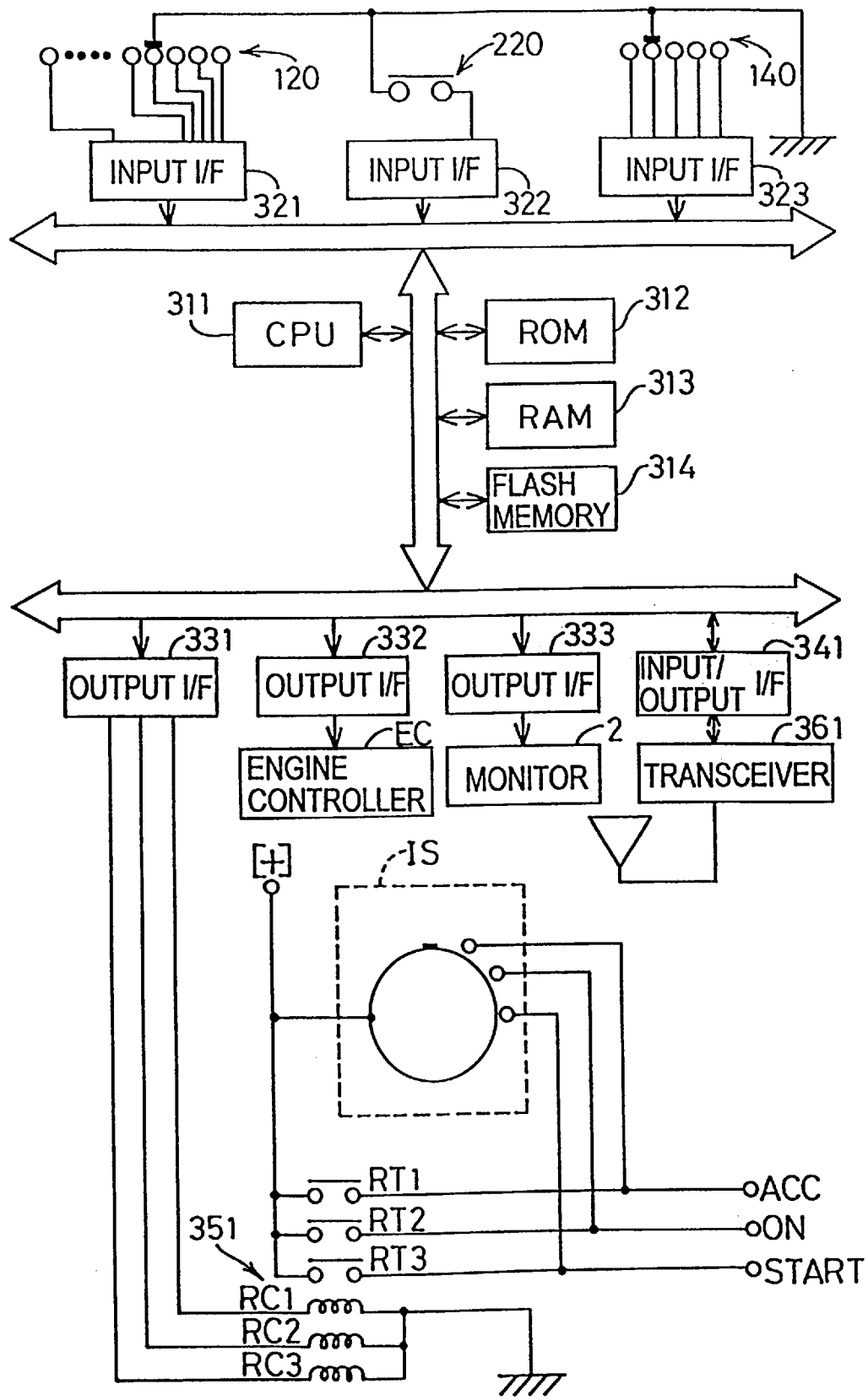
FIG. 2 is a block diagram of the control unit.
Figure 3:
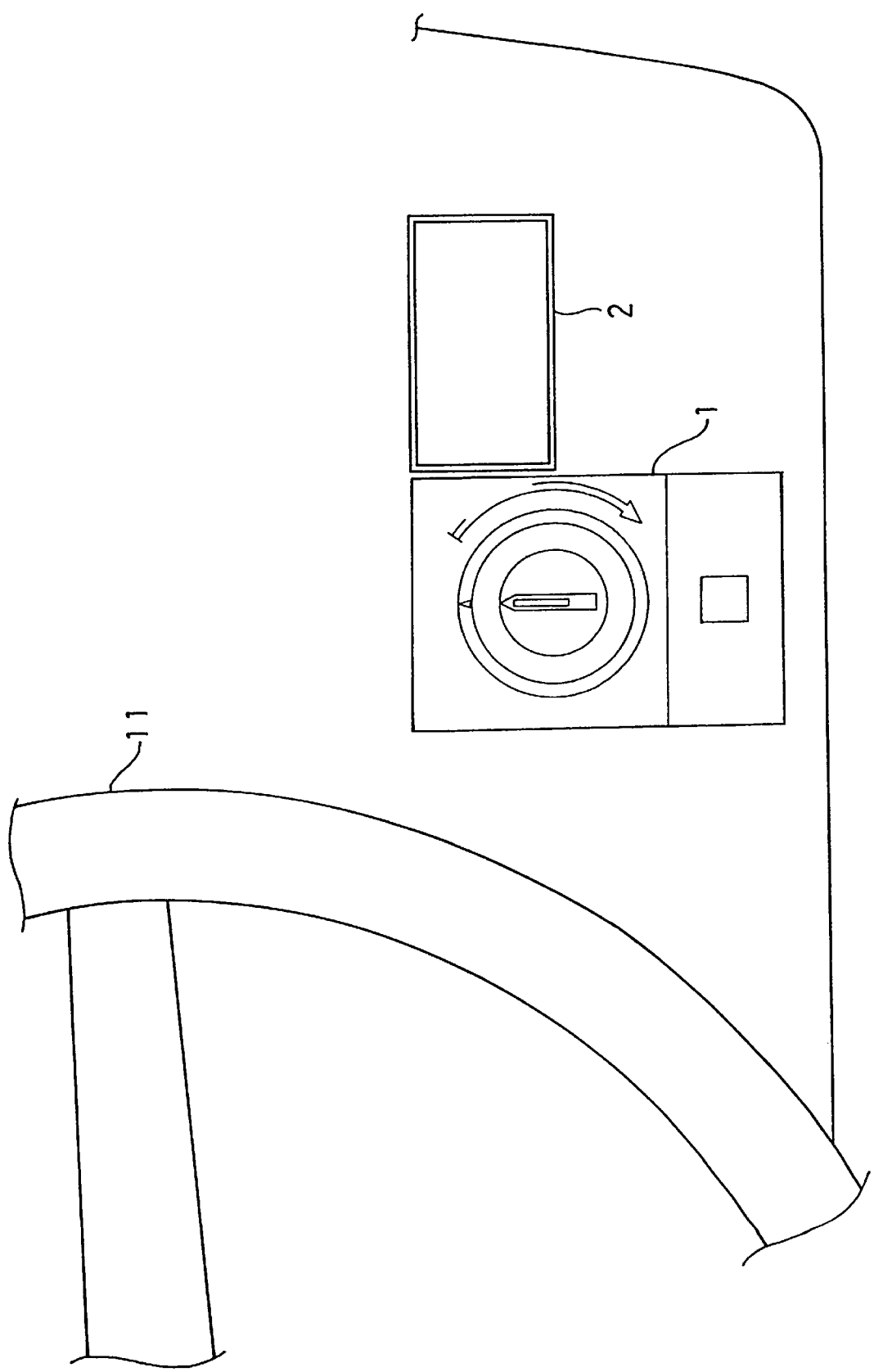
FIG. 3 is an explanatory view of the attached condition of the control unit.
Figure 4:
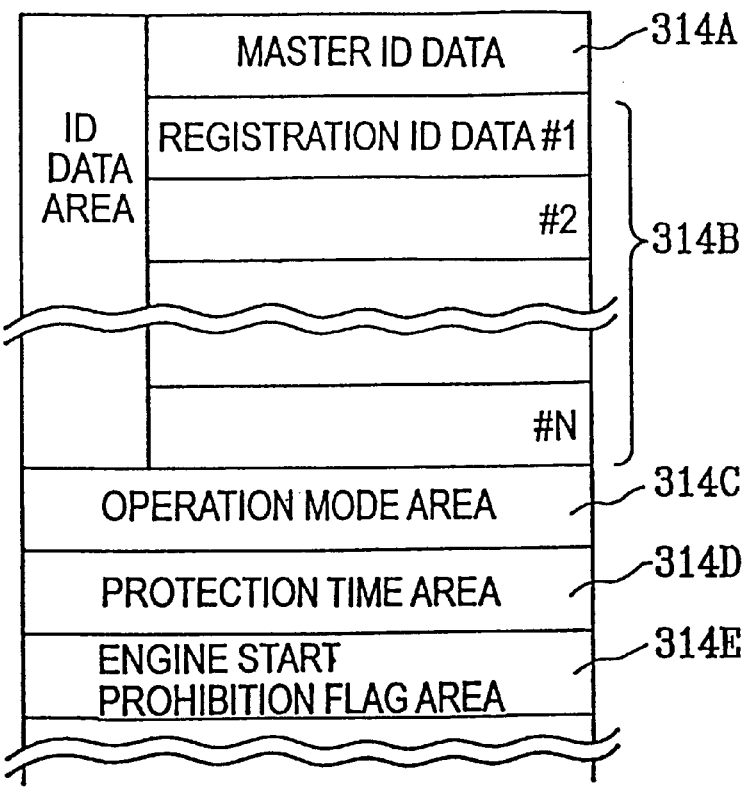
FIG. 4 is an explanatory view of a flash memory.
Figure 5:
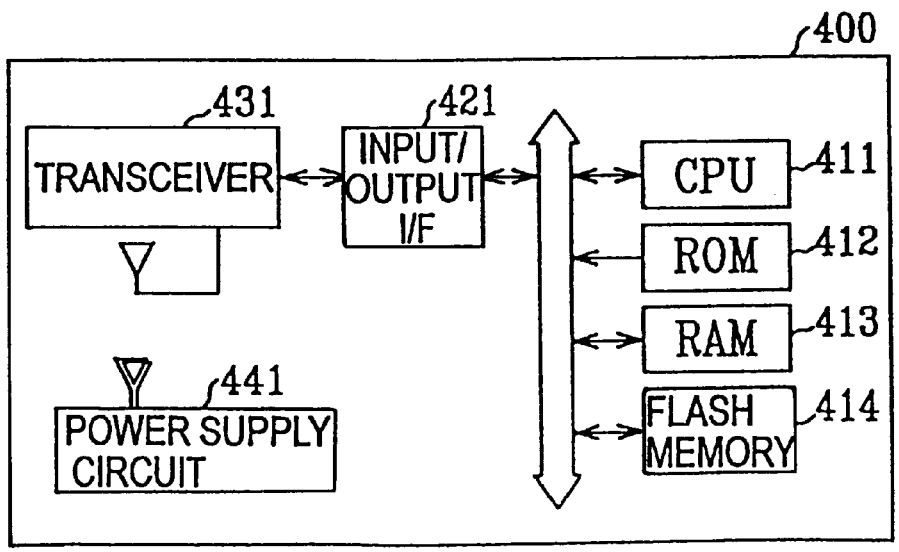
FIG. 5 is a block diagram of an ID card.
Figure 6:
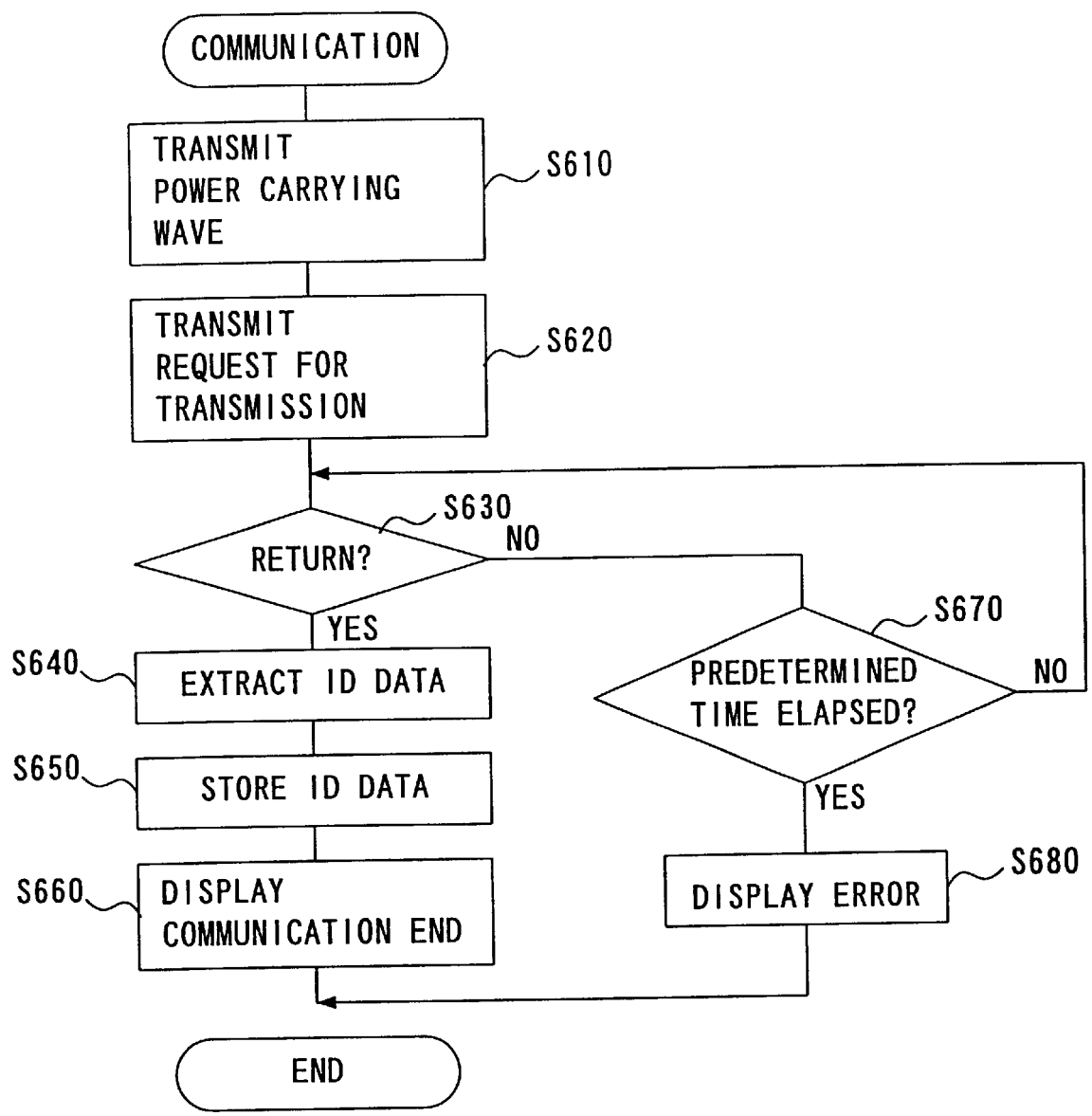
FIG. 6 is a flowchart showing a flow of communication process.
Figure 7:
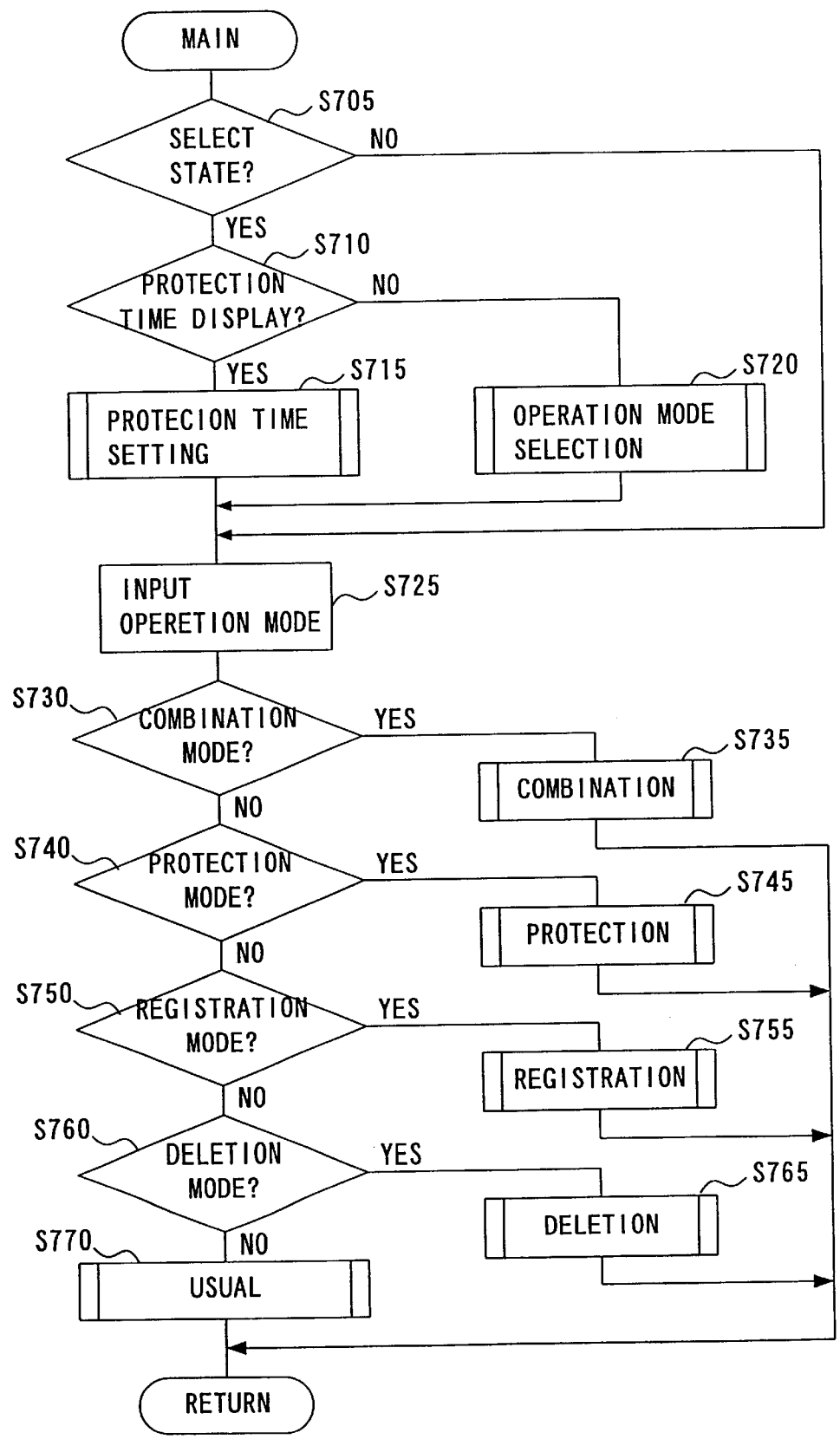
FIG. 7 is a flowchart showing a flow of main routine process.
Figure 8:
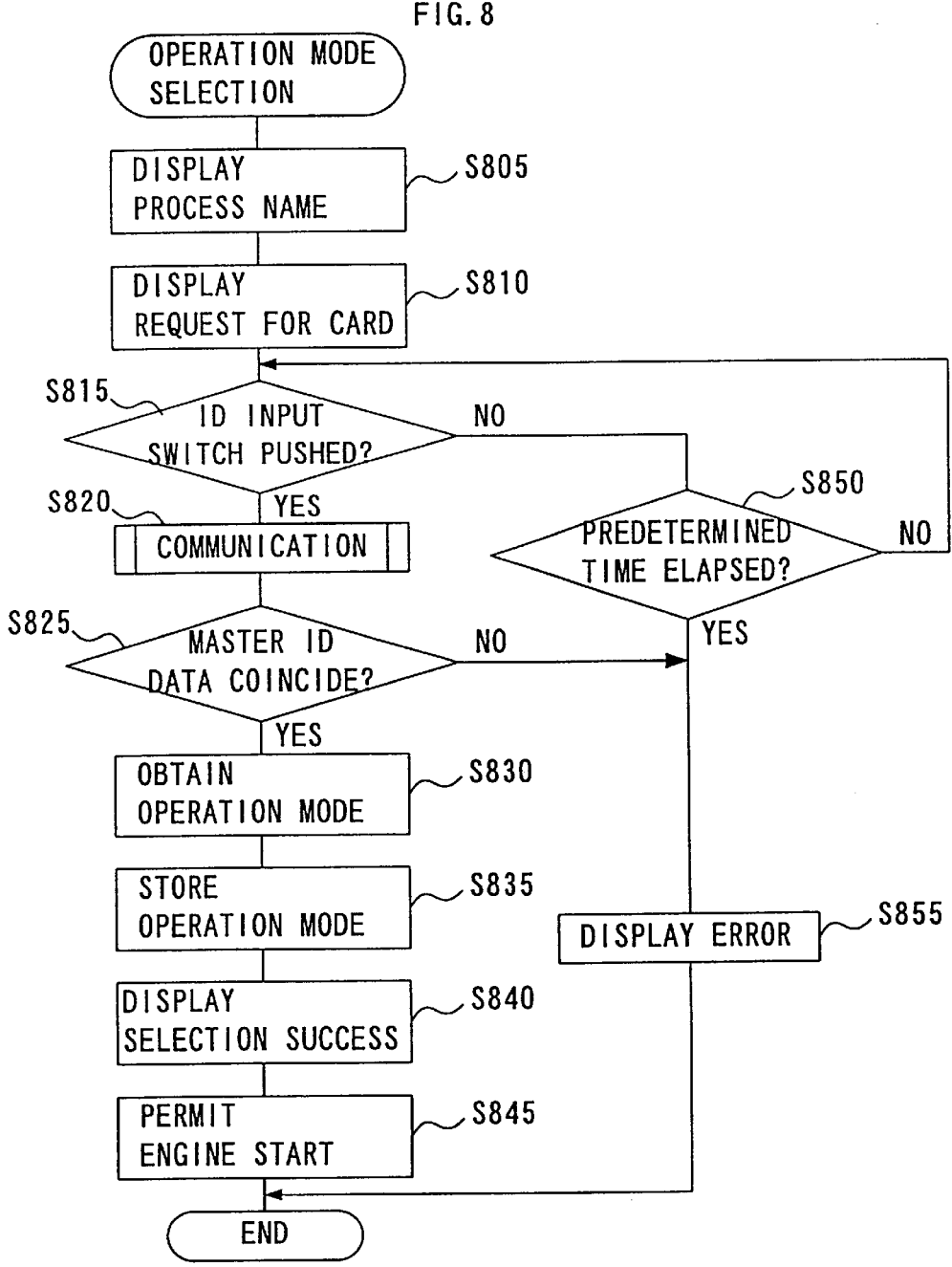
FIG. 8 is a flowchart showing a flow of operation mode selection process.
Figure 9:
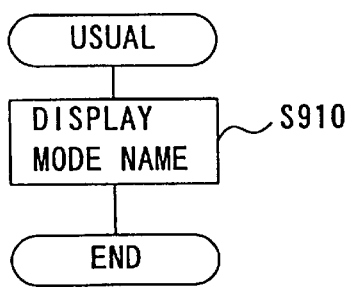
FIG. 9 is a flowchart showing a flow of usual mode process.
Figure 10:
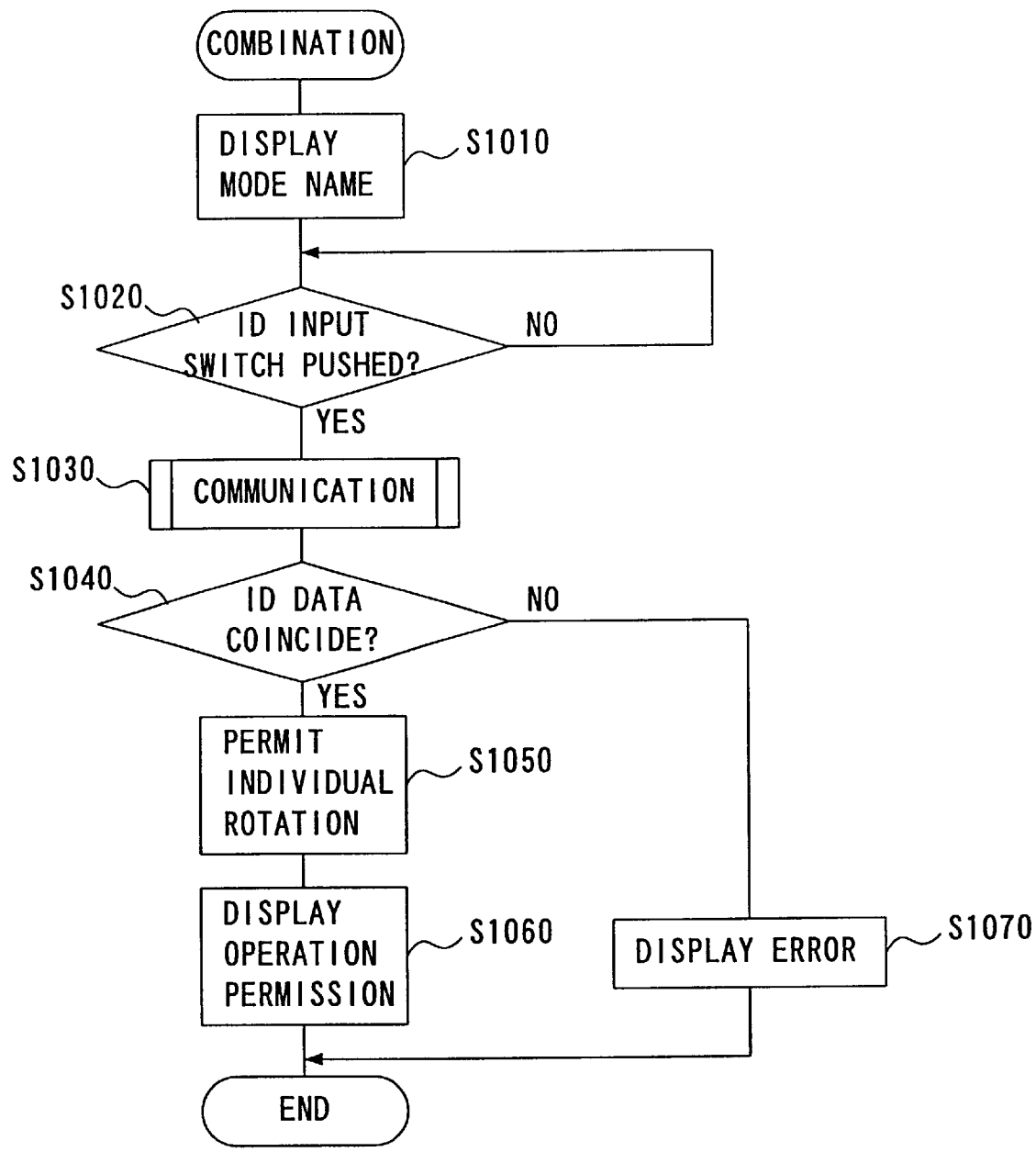
FIG. 10 is a flowchart showing a flow of combination mode process.
Figure 11:
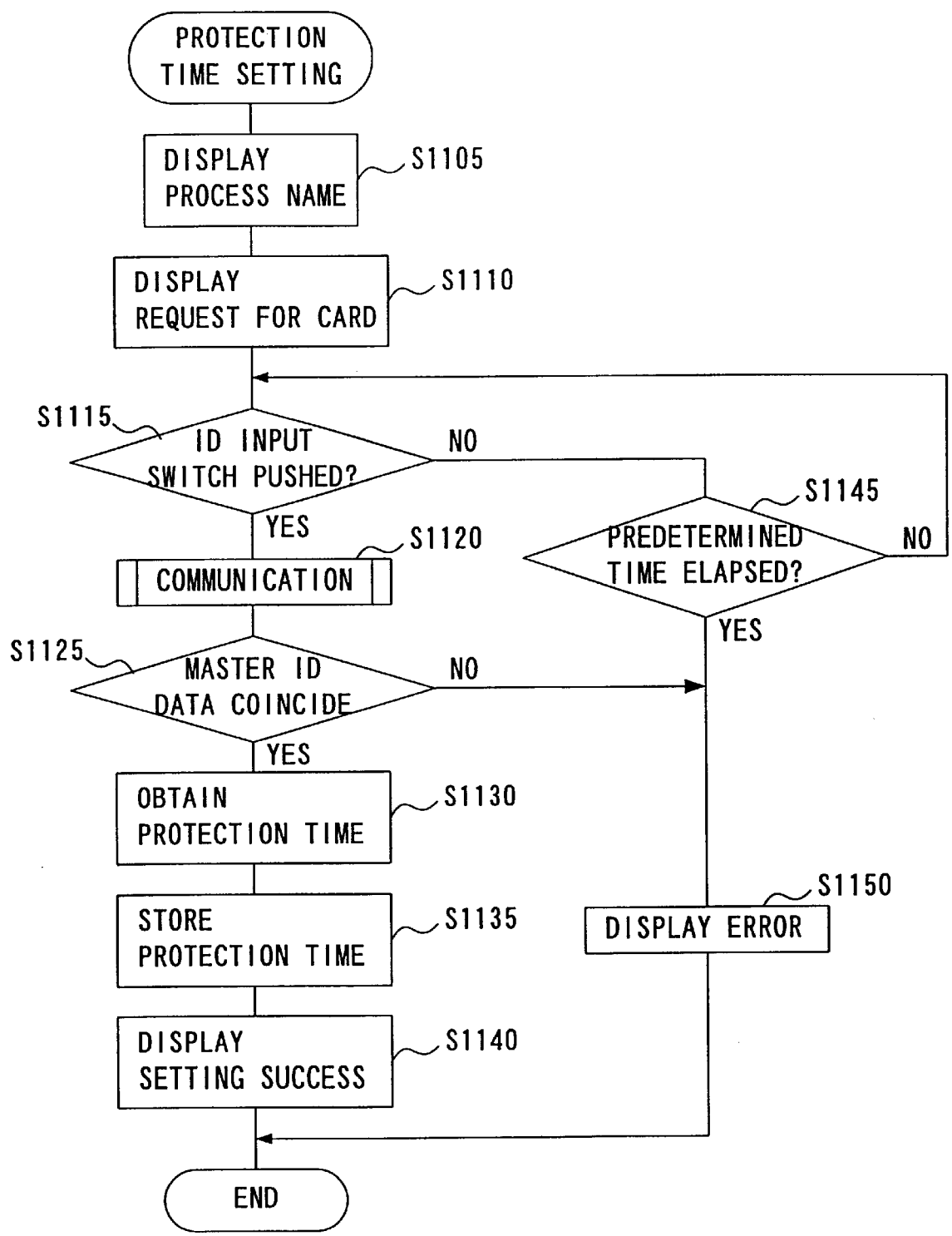
FIG. 11 is a flowchart showing a flow of protection time setting process.
Figure 12:
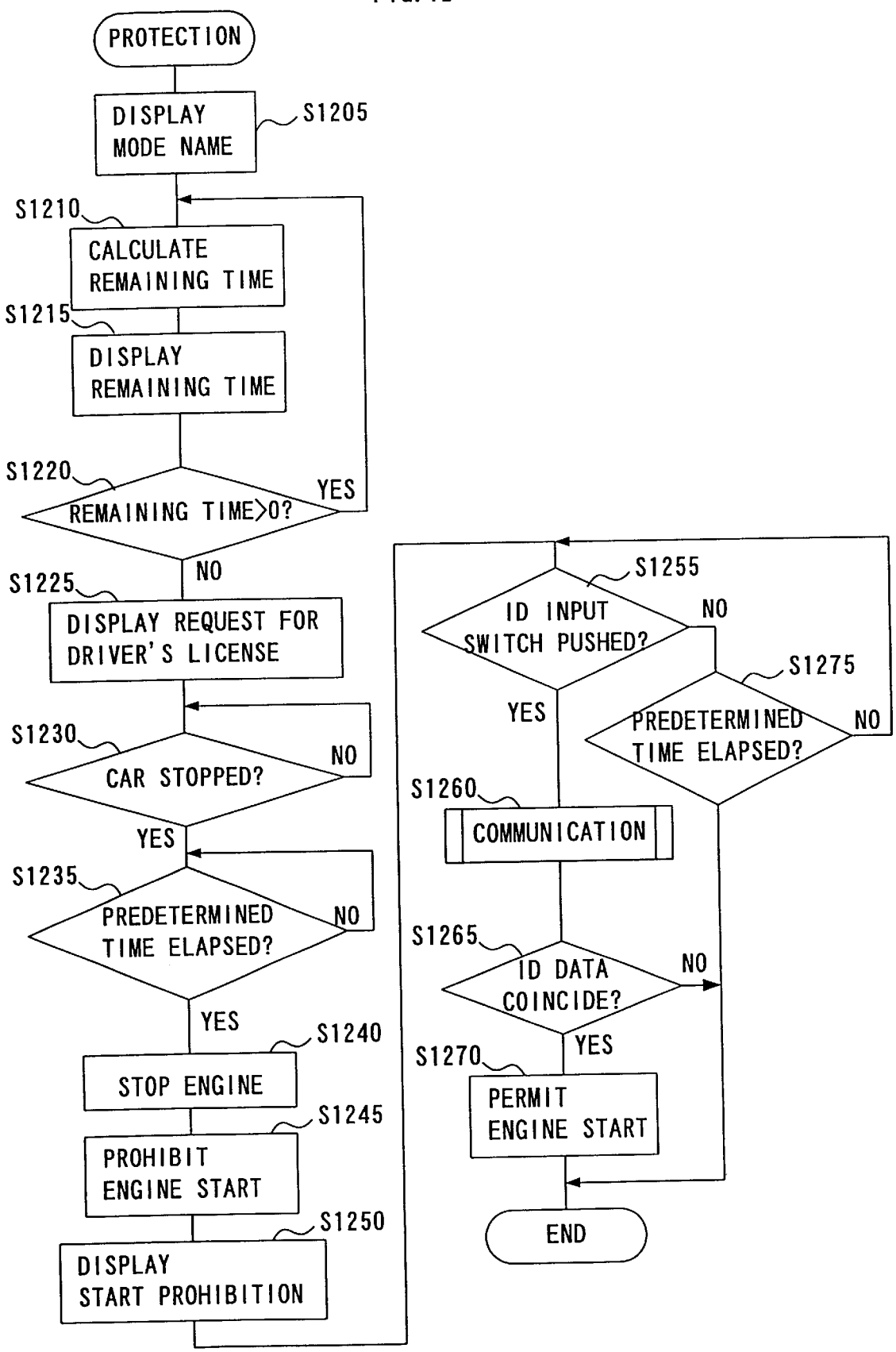
FIG. 12 is a flowchart showing a flow of protection mode process.
Figure 13:
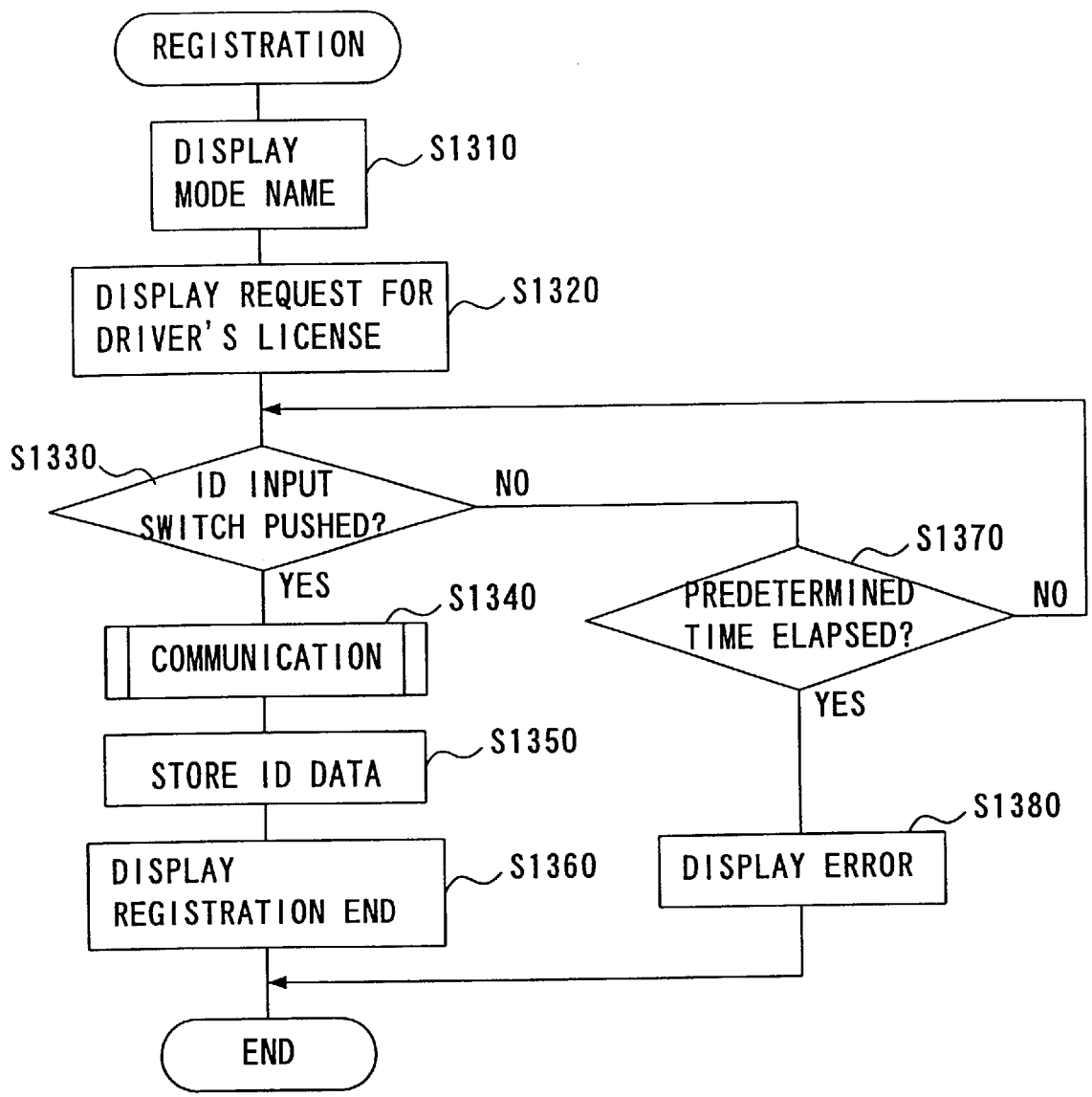
FIG. 13 is a flowchart showing a flow of registration mode process.
Figure 14:
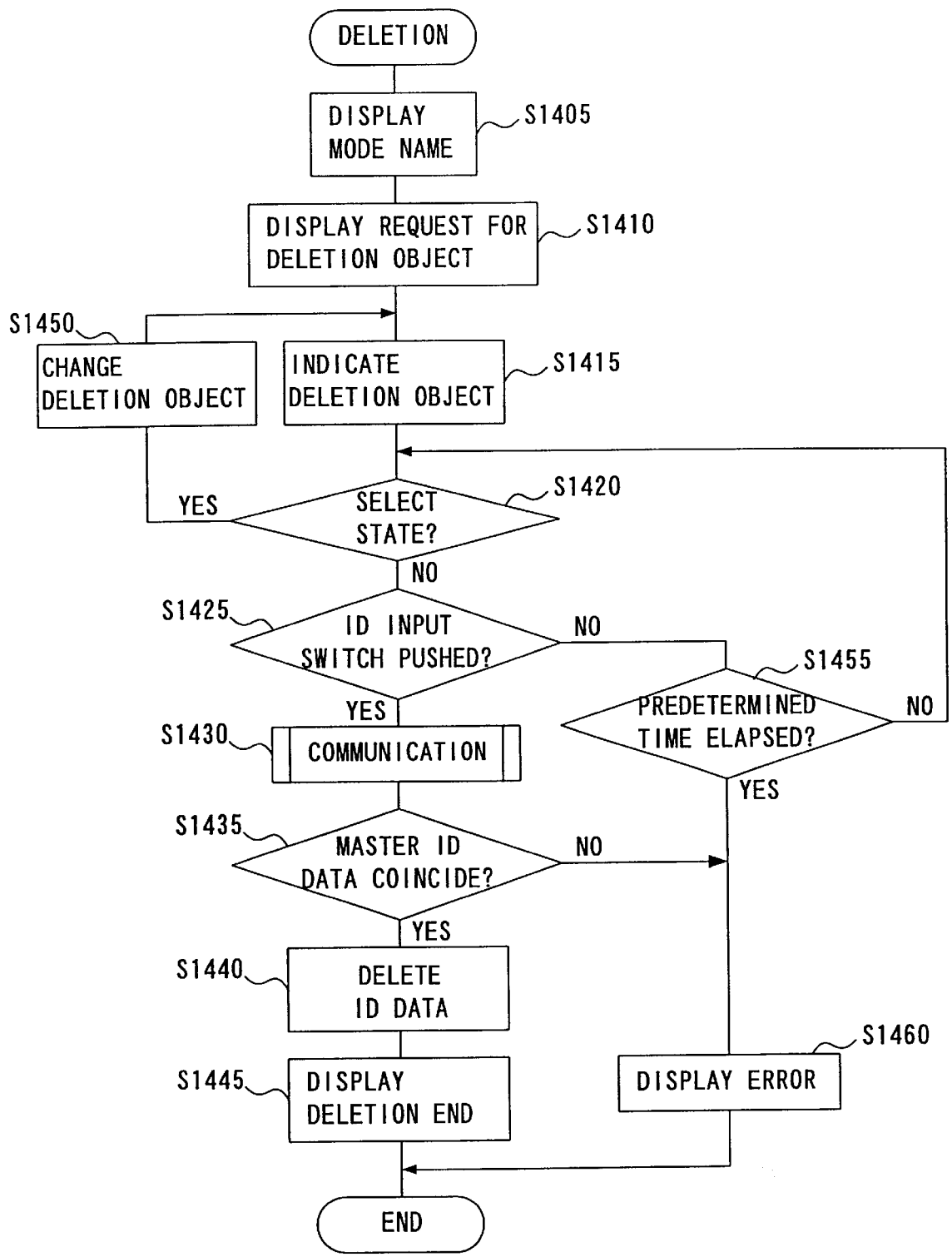
FIG. 14 is a flowchart showing a flow of deletion mode process.
Figure 15:
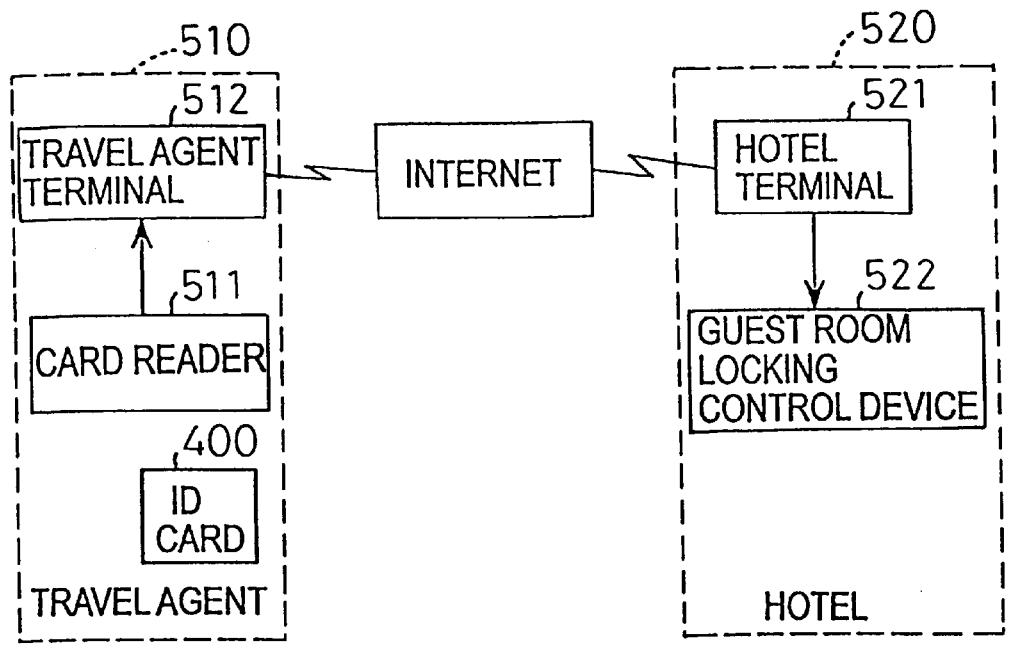
FIG. 15 is a block diagram of a key system according to the second embodiment.
Figure 16:
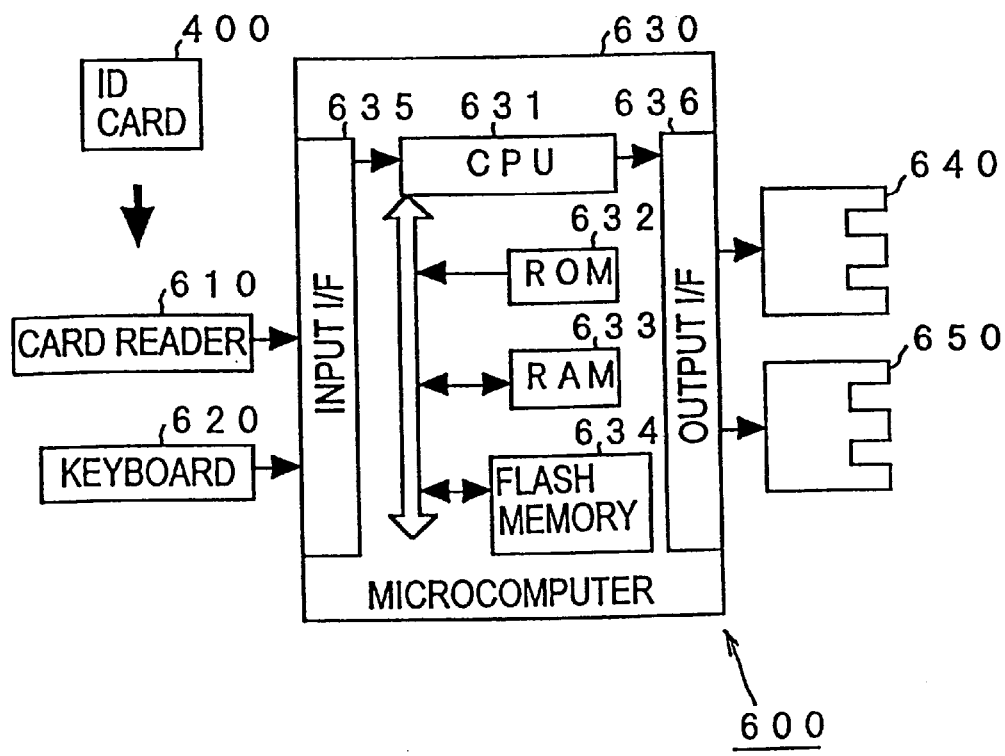
FIG. 16 is a block diagram of a key system according to the third embodiment.
Figure 17:
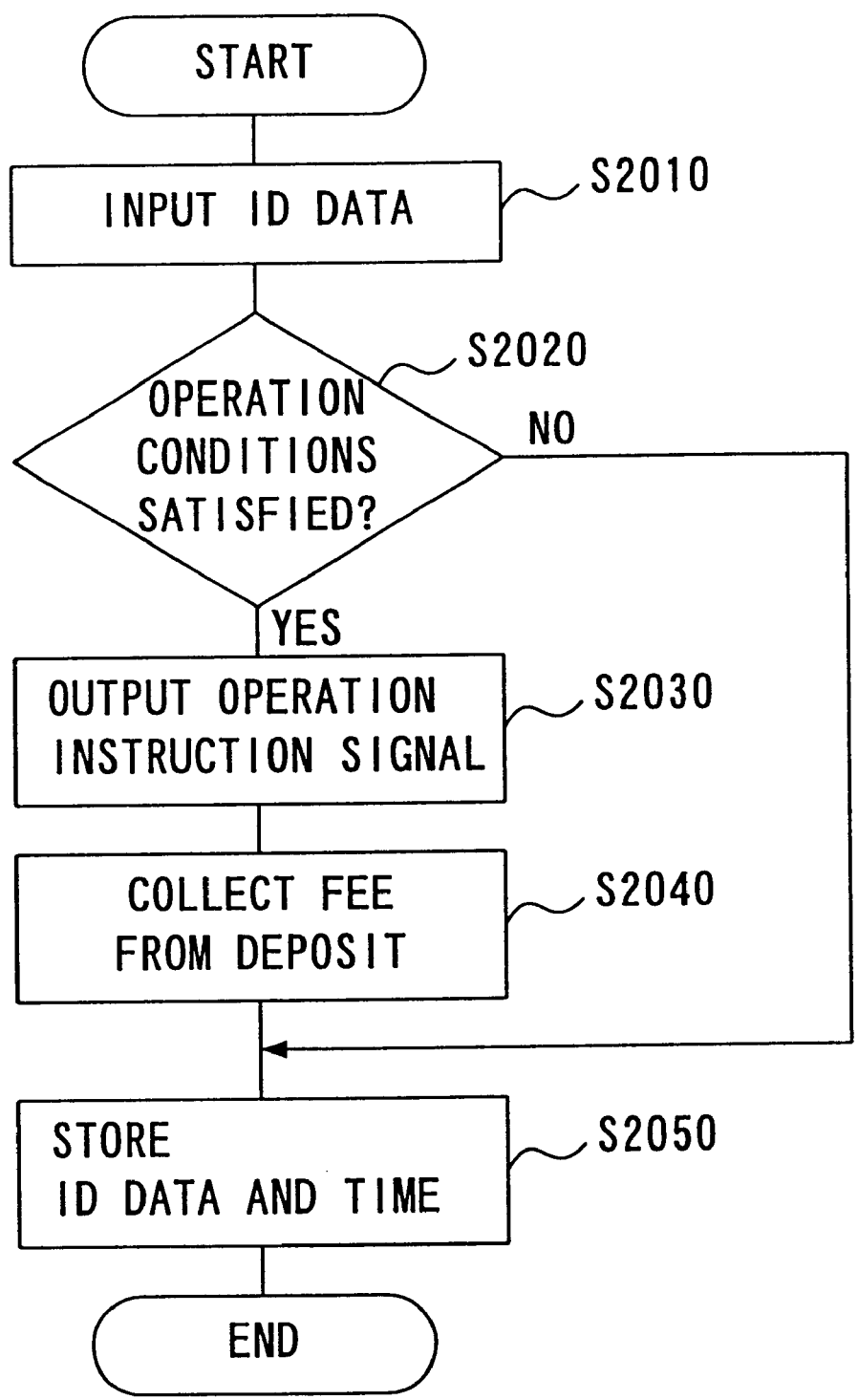
FIG. 17 is a flowchart showing a process flow according to the third embodiment.

1 . . . control unit, 2 . . . monitor, 100 . . . key operation unit,

110 . . . main face plate, 111 . . . protection time sign, 112 . . . protection sign, 113 . . . usual sign, 114 . . . combination sign, 115 . . . registration sign, 116 . . . deletion sign, 120 . . . operation mode selection ring, 121 . . . indicating protrusion, 130 . . . ignition key face plate, 131 . . . SELECT sign, 132 . . . OFF sign, 133 . . . ACC sign, 134 . . . ON sign, 135 . . . START sign, 140 . . . ignition key position indicating plate, 141 . . . alternative ignition key member, 142 . . . insertion port, 200 . . . ID card interface unit, 210 . . . main face plate, 220 . . . ID input switch, 311 . . . CPU, 312 . . . ROM, 313 . . . RAM, 314 . . . flash memory, 314A . . . master ID data area, 314B . . . registration ID data area, 314C . . . operation mode area, 314D . . . protection time area, 314E . . . engine start prohibition flag area, 321 . . . input interface, 322 . . . input interface, 323 . . . input interface, 331 . . . output interface, 332 . . . output interface, 333 . . . output interface, 341 . . . input/output interface, 351 . . . relay unit, 361 . . . transceiver, 400 . . . ID card, 411 . . . CPU, 412 . . . ROM, 413 . . . RAM, 414 . . . flash memory, 421 . . . input/output interface, 431 . . . transceiver, 441 . . . power supply circuit, 510 . . . travel agent, 511 . . . card reader, 512 . . . travel agent terminal, 520 . . . hotel, 521 . . . hotel terminal, 522 . . . guest room locking control device, 600 . . . control device, 610 . . . card reader, 620 . . . keyboard, 630 . . . microcomputer, 631 . . . CPU, 632 . . . ROM, 633 . . . RAM, 634 . . . flash memory, 635 . . . input interface, 636 . . . output interface, 640 . . . operation instruction output terminal, 650 . . . collection instruction output terminal, EC . . . engine controller, IS . . . ignition switch, RC1 . . . relay coil, RC2 . . . relay coil, RC3 . . . relay coil, RT1 . . . relay contact, RT2 . . . relay contact, RT3 . . . relay contact.

What is claimed is:

1. A key system for a lock mechanism activated by at least one of an ID card and a mechanical key, the key system comprising:

ID signal receiving means for receiving ID output signals transmitted from said ID card;

ID extracting means for extracting ID card data from ID output signals received by the ID signal receiving means;

ID storage means for maintaining stored ID data;

coincidence determination means for ascertaining whether or not there is stored ID data coinciding with the ID card data extracted by said ID extracting means;

a memory content change means for adding/deleting stored ID data in said ID storage means and said ID card is, a driver's license, a passport, or other identity proving ID cards;

a mechanical key switch having a port for receiving the mechanical key, the mechanical key switch controlled by an operation enabling means permitting operation of the key switch;

the key system further comprises a first mode and a second mode, in the first mode the mechanical key is received in the mechanical key switch port and the ID signal receiving means receives ID output signals transmitted from said ID card and where the coincidence determination means ascertains coincidence of the stored ID data and the extracted ID card data the operation enabling means is actuated to enable operation of the mechanical key switch and equipment operation; and in the second mode the operation enabling means is actuated solely by the ID card wherein the ID signal receiving means receives ID output signals transmitted from said ID card and where the coincidence determination means ascertains coincidence of the stored ID data and the extracted ID card data, the operation enabling means is actuated to enable operation of the mechanical key switch and equipment operation without the mechanical key.

2. The key system for a lock mechanism as set forth in claim 1 further comprising a master ID card wherein the key system is selected to be operated in one of the first and second mode by setting the mechanical key switch to an operation mode selection position and the ID signal receiving means receives master ID card data transmitted from said master ID card and where the coincidence determination means ascertains coincidence of stored master ID data with the master ID card data one of the first and second modes is selected.

3. The key system for a lock mechanism as set forth in claim 2, wherein the mechanical key switch receives the mechanical key to enable setting of the mechanical key switch to the operation mode selection position.

* * * * *